Patented May 17, 1927.

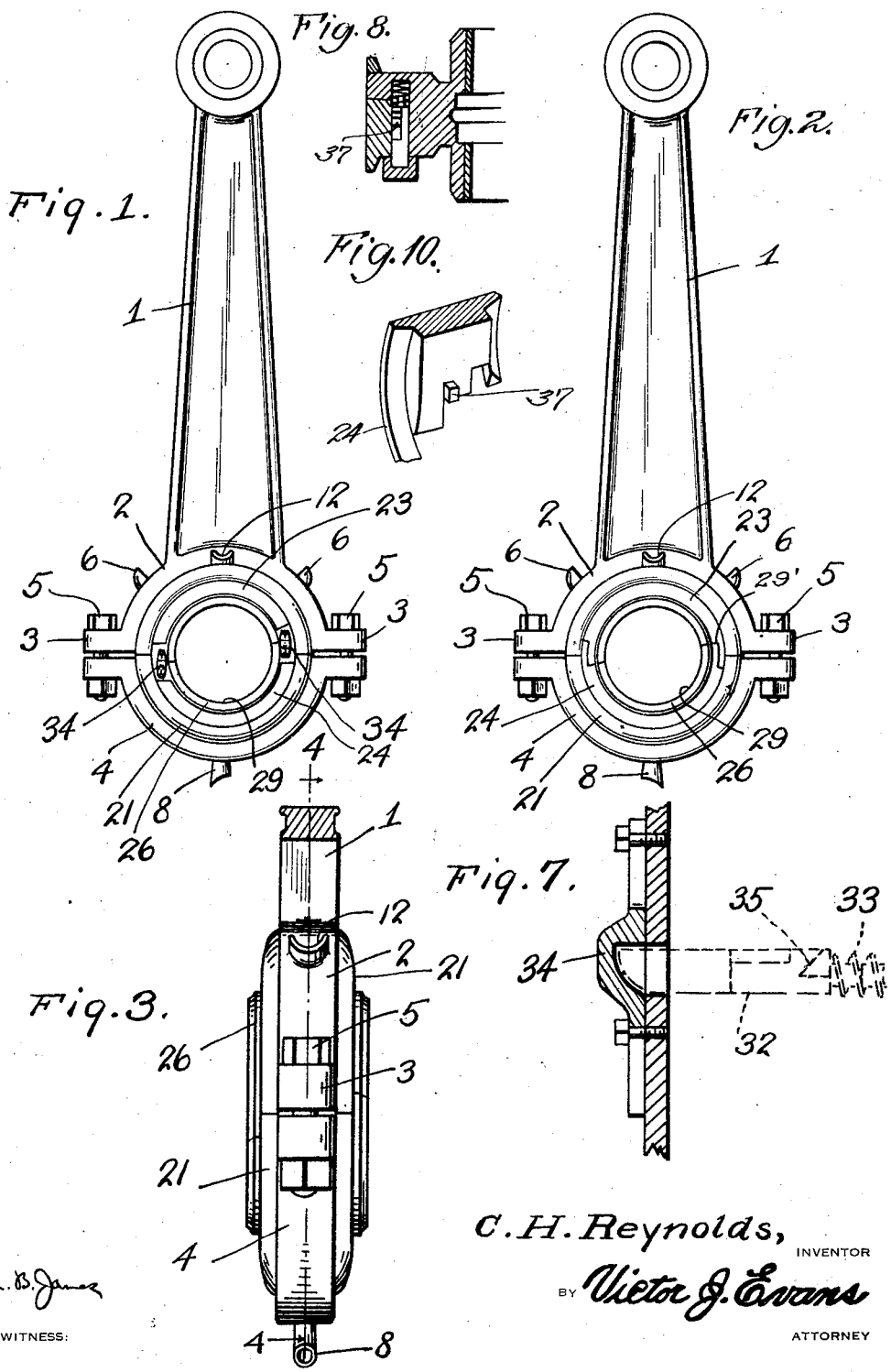

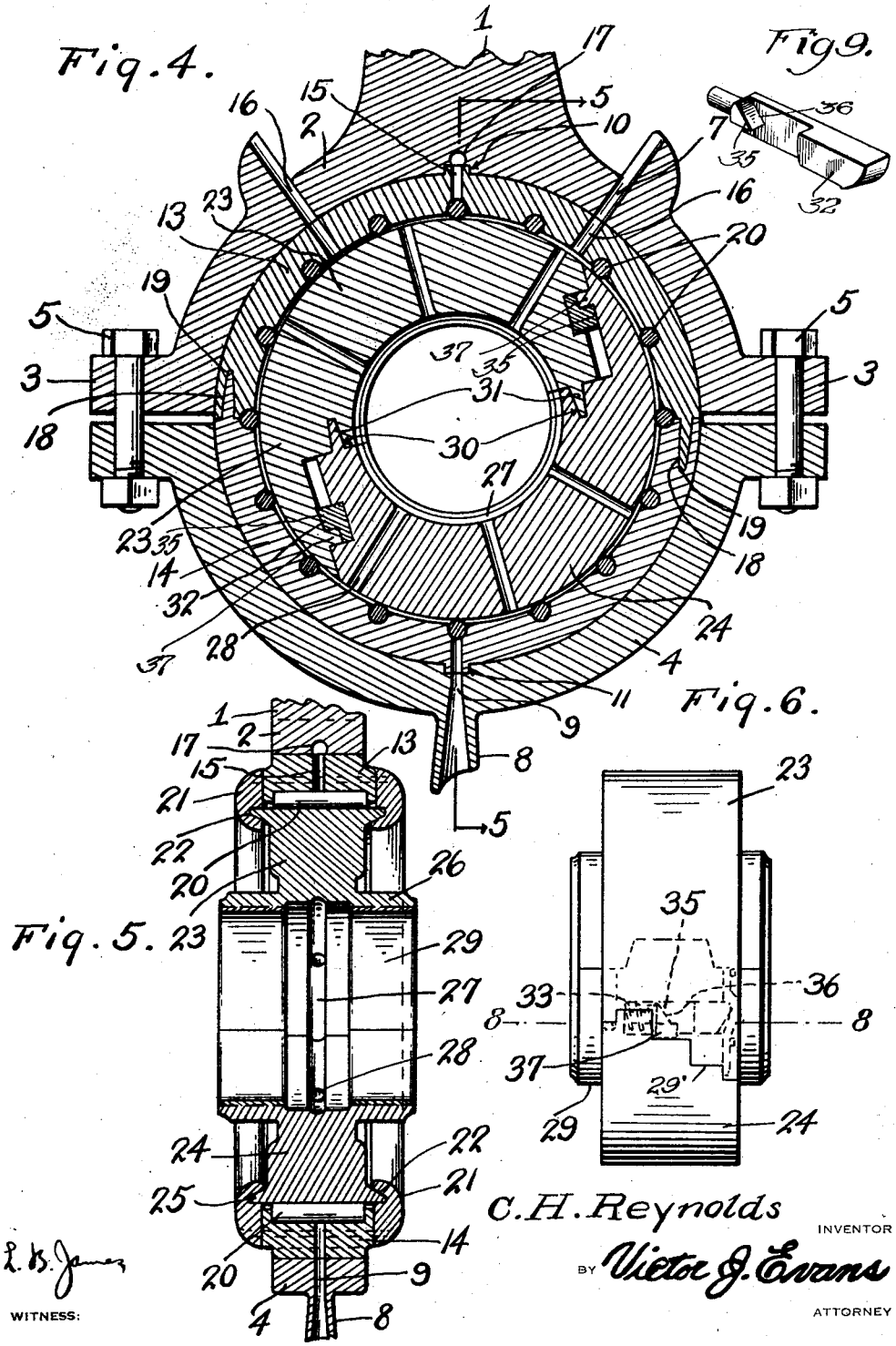

1,629,413

UNITED STATES PATENT OFFICE.

CHARLES HERBERT REYNOLDS, OF CANTON, OHIO.

BEARING.

Application filed April 21, 1926. Serial No. 103,576.

My present invention has reference to a bearing which is primarily designed for use between the crank shaft and the piston connecting rod of an automobile engine but which, of course, may be used in other connections, and my primary object is the provision of a bearing which will hold the connecting rod and crank shaft properly related, which will decrease friction between these parts, and consequently materially add to the life thereof and further a construction in which all of the parts are automatically lubricated.

A further object is the provision of a bearing for this purpose comprising an inner and an outer member, each constructed of two parts associated in a novel manner, and which is removably fixed on the crank shaft and turns on antifrictional rollers carried by the outer bearing member, and which is held from movement in a simple but effective manner on the bearing connecting rod.

A further object is the provision of a bearing connecting rod and a crank shaft, of a bearing therebetween, comprising inner and outer members, each formed of two parts, the outer bearing member having a locking engagement with the connecting rod, the inner bearing member having a Babbitt metal lining which is brought to tightly embrace the crank shaft so that the inner bearing member will turn with the crank shaft, there being guides between the inner and outer bearing members as well as anti-frictional bearings, while further both the bearing members and the connecting rod are provided with oil ports that are designed to align, and wherein all of the parts will be properly lubricated, the manner of delivering lubricant being of the splash system, the lubricant being picked up from the oil well in the pan by the reciprocation of the connecting rod.

The improvement further resides in certain other novel features of construction, combination and operative association of parts, a satisfactory embodiment of which is illustrated by the drawings which accompany and form part of this application.

In the drawings:

Figure 1 is a side elevation of my improvement.

Figure 2 is a similar view looking toward the opposite side thereof.

Figure 3 is an edge view thereof looking toward the lower part of the connecting rod.

Figure 4 is an enlarged sectional view approximately on the line 4—4 of Figure 3.

Figure 5 is a sectional view approximately on the line 5—5 of Figure 4.

Figure 6 is a side view of the inner bearing member.

Figure 7 is a detail sectional view to illutsrate the housing for the spring influenced latch that locks the sections comprising the inner bearing member together.

Figure 8 is a sectional view approximately on the line 8—8 of Figure 6.

Figure 9 is a perspective view of one of the latches.

Figure 10 is a fragmentary perspective view of one of the bearings to illustrate the arrangement of the lug thereon.

The connecting rod 1 has its body portion of the usual construction and its shaft receiving end 2 concaved in the usual manner and provided with outstanding ears 3 to align with similar ears on the cap member 4 for this end of the connecting rod. Adjustable means 5, of the usual construction, pass through the ears 3 of the elements 2 and 4. The rounded sides of the part 2 of the connecting rod are formed with outwardly extending oppositely directed cups 6 that register with ports 7, while the cap member 4 is provided with a centrally arranged downwardly extended splash cup 8 that communicates with a port 9 in the said cap. Also the parts 2 and 4 are centrally formed with transverse grooves 10 and 11, respectively, and the ends of grooves 10 being preferably closed by splash cups 12.

Received in the rounded opening provided in the mentioned end of the bearing rod 1, there is the outer ring member of my improved bearing. The ring member, comprises two semi-circular sections 13 and 14, respectively. Each of these sections is provided with transverse lugs 15, respectively, that are designed to be received in the grooves 10 and 11, whereby the outer bearing member is held from movement on the connecting rod 1. The sections 13 and 14 of the bearing member are provided with ports 16 that register with the oil inlet ports 7 and 9, and also with ports 17 that are arranged opposite and communicate with the notches 10 and if desired 11. At their confronting ends the sections 13 and 14 are provided with interengaging tongues and grooves 18 and 19, respectively, the walls of the grooves being inclined inwardly and the tongues being correspondingly shaped.

The sections 13 and 14 have journaled in suitable rounded depressions arranged transversely thereof and communicating with their inner peripheries, rollers 20. These rollers project a slight distance inwardly of the outer bearing member. The sections comprising the outer bearing member, are each formed on their sides with inwardly directed lugs 21 whose inner faces are formed with notches 22. The lugs are arched in plan, to correspond with the periphery of the outer bearing member and the grooves 22 are likewise arched or rounded.

The inner bearing comprises two sections, each of which is comparatively thick and semi-circular in plan. For distinction these members are indicated by the numerals 23 and 24, respectively. The inner bearing is formed with peripherally arranged laterally projected flanges 25 which are freely received in the grooves 22 of the lugs 21, it being, of course, necessary that the bearing sections be separated before the parts may be thus arranged. The flanges 25 ride freely through the grooves 22, and the outer periphery of the inner bearing member is at all times in contact with the anti-frictional rollers 20. The inner bearing member has a central laterally extending hub 26, and the hub, at the central portion thereof, is formed with an annular groove 27. The inner bearing member is provided with a series of laterally extending ports 28 that establish oil communications between the ports 16 and the groove 27. The hub, at the opposite sides of the groove 27, has arranged therein babbitt bearing rings 29 and these rings are designed to be brought into frictional engagement with the crank shaft for the bearing, the latter not being illustrated by the drawings. By adjusting the means 5 the bearing sections have their confronting ends brought into tight frictional engagement. The outer periphery of the inner bearing members, at the confronting ends of the sections thereof, is stepped to provide contacting shoulders 29', the said outer periphery or what may be properly termed the rim, of the inner bearing sections having one of their ends extending beyond the body portion of the said section and the opposite ends of the said rims recessed so that the ends of the rim portions of the said sections are thus brought into lapping engagement. One end proper of each of said sections is formed with a transverse groove 30 to receive the projecting tongue 31 on the end of the cooperating section, while in the depressed portion of each section there is arranged and slidably movable a laterally directed latch member 32. These latch members are influenced by springs 33 and have one of their ends received in suitable housing plates 34. The body portion of each latch 32 is formed with a lug 35, preferably provided by notching the said bolt and one face of the lug is cut at an angle, as at 36, dotted lines Figure 6. On the overlying periphery or flange of the inner bearing section there is an inwardly extending lug 37 which has one of its faces beveled and the contacting engagement of this beveled face with the lug on the locking bolt will move the latter against the influence of its spring so that the lug 37 will ride over and behind the lug 35, whereby the bearing sections are effectively locked together. One, or if desired, both of the latching bolts 32 may have a tail portion that merges into a handle 34 so that a pressure thereupon will move the latching bolt to bring the locking portion 35 thereof out of engagement with the lug 37 and thereby permit the ready separation of the inner bearing sections. The simplicity of the construction and the advantages thereof will, it is thought, be perfectly apparent to those skilled in the art to which this invention relates when the foregoing description has been carefully read in connection with the accompanying drawings. It will be noted that the reciprocatory movement of the connecting rod 1 will deliver the lubricant on to the bearing. The outer bearing is fixedly secured to the connecting rod, and consequently is held from turning. The bearing is likewise held from longitudinal movement through the connecting rod. The inner bearing member is effectively held from lateral movement in the outer bearing member, and at all times has its periphery contacted by the anti-frictional rollers 20. This inner bearing is constantly lubricated and is fixed to the crank shaft in a simple manner as heretofore described so that the inner bearing will revolve with the crank shaft. The connection between the crank shaft and the rod reduces friction between these parts to a minimum, the bearing holding both of these parts in proper working alignment, and as all the parts, including the bearing and the crank shaft are constantly lubricated the life of all of the elements constituting the improvement and associated therewith is materially increased.

Having described the invention, I claim:

The combination with a crank shaft and a piston connecting rod therefor, of a bearing between said rod and shaft, comprising an outer member fixed on the rod, an inner member fixed on the shaft, revoluble therewith and finding a bearing in the outer member, said outer member comprising segmental ring sections, interengaging tongues and grooves between said sections, anti-frictional rollers carried by said outer member, means for locking the outer member in the rod, said outer member having spaced ports, and the rod being also provided with ports aligning with the bearing ports and with cups that surround the said ports, said inner member comprising a plurality of ring sections, said sections having peripheral stepped overlying portions, spring influenced latching means for locking the inner bearing sections and for securing said sections on the crank shaft, and said inner bearing member having ports communicating with the center thereof and designed to register with the first mentioned ports.

In testimony whereof I affix my signature.

CHARLES HERBERT REYNOLDS.